April 12, 1932.   R. P. E. VIAUDEY   1,853,789
REAR SEAT WINDSCREEN
Filed May 27, 1930
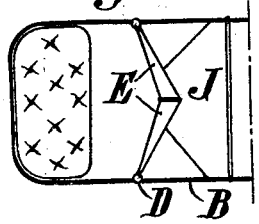
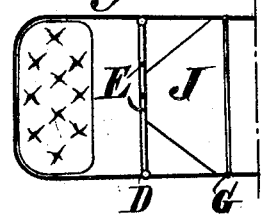
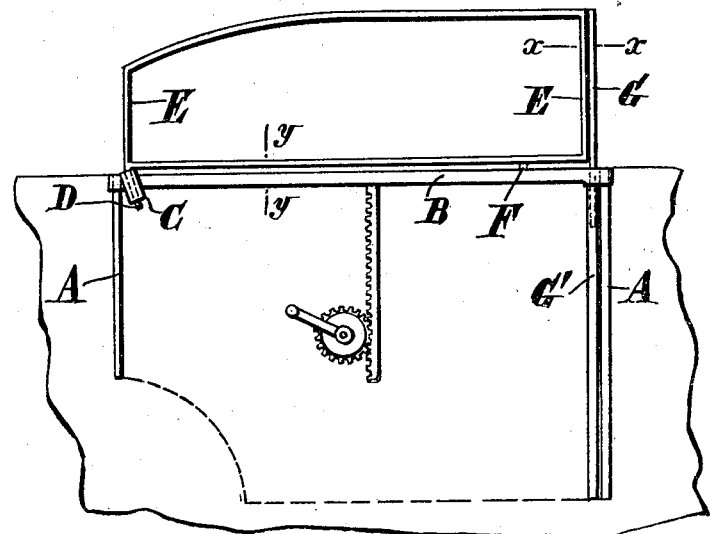
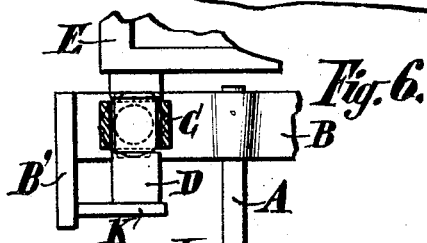
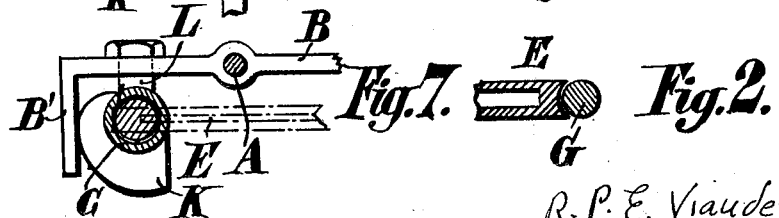

Patented Apr. 12, 1932

1,853,789

UNITED STATES PATENT OFFICE

ROGER PAUL EDOUARD VIAUDEY, OF PARIS, FRANCE

REAR SEAT WINDSCREEN

Application filed May 27, 1930, Serial No. 456,170, and in France June 8, 1929.

The device forming the subject of the present invention permits a window or translucent panel of any kind to be operated vertically in the lateral plane of a vehicle or to be moved transversely in the interior of the vehicles while permitting the said window or translucent panel to take up and maintain automatically all desired positions even out of its original perpendicularity.

This device is illustrated by way of example in the accompanying drawings, in which:

Figure 1 is a side elevation.

Figure 2 is a section taken along the line x—x in Figure 1.

Figure 3 is a section taken along the line y—y in Figure 1.

Figures 4 and 5 are plan views showing two positions of the windows as wind screens.

Figures 6 and 7 show modifications in elevation and plan view respectively.

This device is composed of two fixed vertical members A and A' upon which a member B slides. On this member B is arranged at C a yoke inclined on one or two planes according to the secondary effect which is to be obtained with it and which is hereinafter described. In this yoke C turns a pivot rigid with the frame E receiving the window or translucent material. This pivot is more or less inclined with respect to the said frame, these inclinations corresponding to those of the yoke C.

For the vertical operation or more generally expressed window lifting the frame E is rigid with the member B on account of the fact that its end D is engaged in the yoke C which is itself mounted on B. In order to complete this connection any suitable arrangement for obtaining the temporary union of B and E may be employed such as that provided at F.

A method of connection is indicated by way of example in Figure 3 which comprises a rubber member H fixed on B and lodged in a small groove in E; a plate I of any shape forms a stop for the frame E and carries at F a rallying piece. The member B and the frame E are lifted by a mechanical device of any kind controlling B, the displacement of which takes place in a strictly vertical plane on account of its fixed guidance at A and A'. In order to secure a perfect rigidity of the frame E a telescopic rod G slidable in a tube G' is provided. The rod G which can be operated by any suitable means engages with easy friction in the edge of the frame E, as shown in Figure 2.

In order to position the frame E in the windscreen position, that is, transversely across the vehicle, the sliding member G is lowered into the tube G'. The frame E, being in the raised position, is liberated and can pivot in C without leaving the member B.

At this moment it takes up any suitably chosen transverse position in the interior of the vehicle; the inclination of the member D engaged in the inclined yoke C produces an oblique displacement of the frame E, which permits it to be moved automatically in any desired angle as a wind screen. Similarly, this inclination of the arrangement C D which is suitably chosen for each type of vehicle produces a curvilinear arrangement of the frame E which permits it to be moved over points situated inside the vehicle at a lighter level than B; for example it permits it to pass over a curved deck on a vehicle body.

The same effect may be obtained by providing C and D with a helical ramp giving a gradual lifting movement to the arrangement E D when the frame is moved towards the inside of the vehicle. Similarly this displacement of E in different planes may be obtained by cams or guiding devices acting on the pivot D.

In the form of construction shown in Figures 6 and 7, the pivot D is arranged in alignment with the frame E and the yoke C is pivotally mounted at L on the member B. The pivot D is provided at its base with a cam K bearing on a fixed point, for example a branch B' of the member B.

It will then be understood that by moving the windows of the two doors towards the interior of the vehicle, a complete wind screen can thus be formed which may be combined with a horizontal movable shield J in order to provide a complete protection for the passengers. In this case the frames E bear upon this shield and may if desired be connected with it.

Figure 4 shows a plan view of the back part of a motor vehicle with the windows moved to form a wind screen making an angle.

Figure 5 is a similar view in which the windows have dimensions such that they can be moved into alignment with each other. These examples are only given by way of indication and any other positions may be given to the windows according to their dimensions and the inclination which is given to the members C and D or according to the shapes of the cams or other guiding devices. Similarly the shields J may be constructed in any suitable ways and may fold up wholly or partly.

What I claim is:

1. Rear seat windscreen, comprising window lifting means for moving the side windows in a vertical plane in the walls of the bodies of the vehicles and means for moving the said windows when in the raised position and making them occupy a position inside the vehcle in which they act as wind screens, each window comprising a frame pivotally connected at one of the extreme points of its lower side on a frame arranged in the wall of the body whereby it can be raised and lowered in a vertical plane, the pivotal connection consisting of a pivot carried by the frame of the window engaged in a yoke mounted upon the operating frame, the said pivotal connection being so arranged with respect to the frame of the window as to permit the window to be moved vertically and also in an inclined position inside the vehicle to form a wind screen.

2. A device as claimed in claim 1, wherein the pivotal connection is normal to the frame of the window.

3. A device as claimed in claim 1, wherein the pivotal connection is inclined with respect to the frame of the window.

4. Rear seat windscreen as claimed in claim 1, comprising a pivot attached to the window frame in the plane of the glass, a sleeve pivotally mounted on the operating frame and a cam on the pivot, below the sleeve, the said cam co-operating with a bent over part of the operating frame.

In testimony whereof I have signed my name to this specification.

ROGER PAUL EDOUARD VIAUDEY.